UNITED STATES PATENT OFFICE.

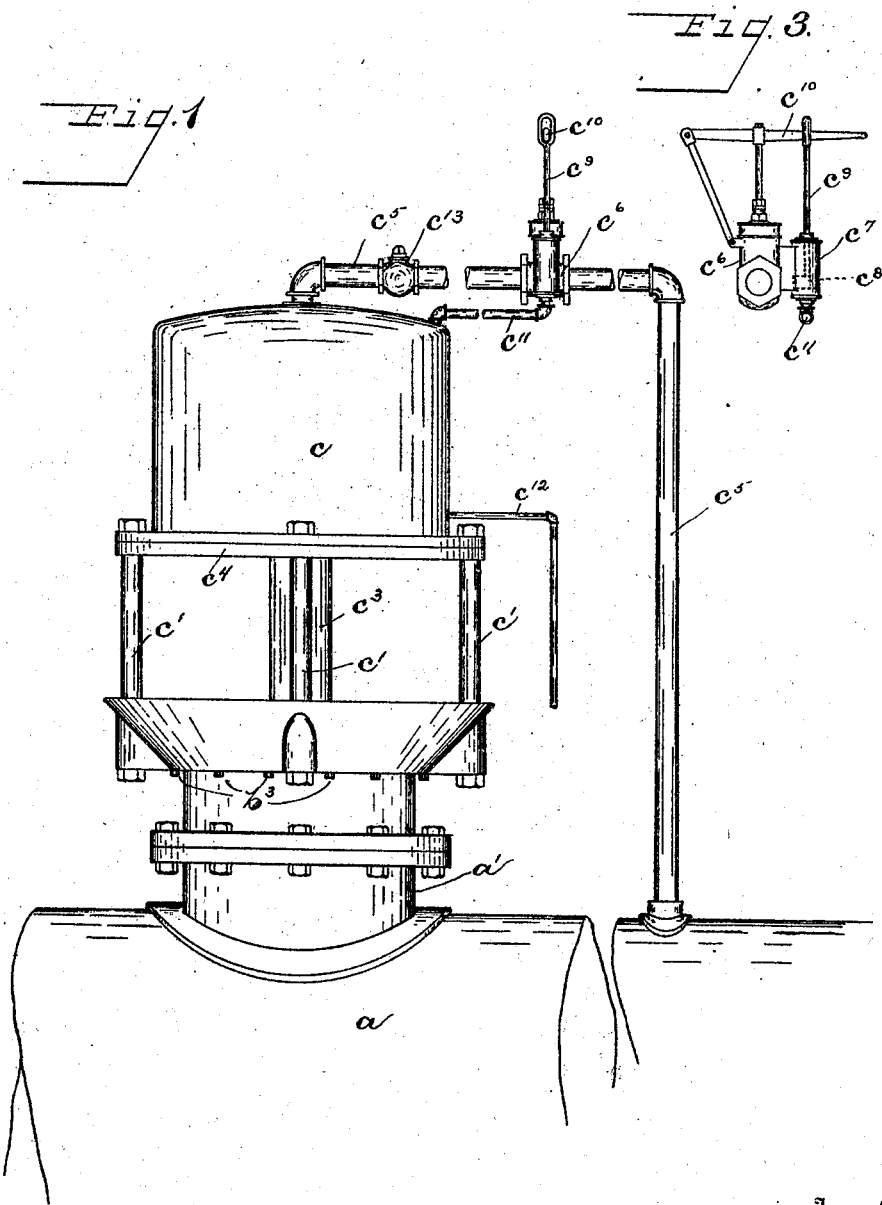

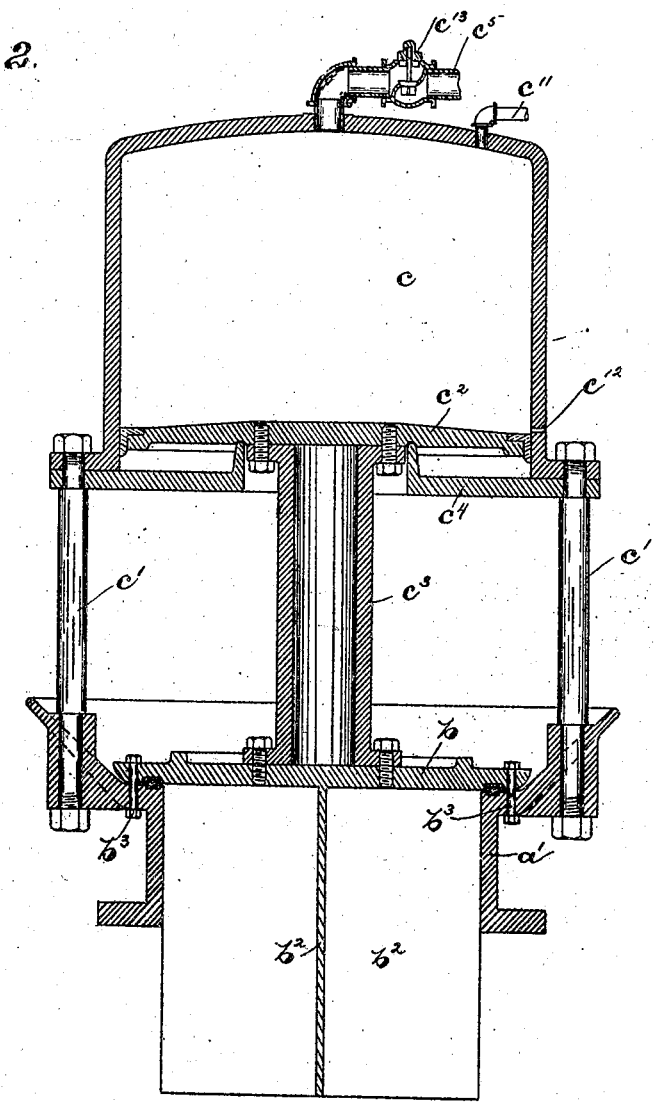

FULLER TRUMP, OF SPRINGFIELD, OHIO, ASSIGNOR TO THE TRUMP MANUFACTURING COMPANY, OF SPRINGFIELD, OHIO, A CORPORATION OF OHIO.

RELIEF-VALVE FOR PIPES.

No. 815,236.     Specification of Letters Patent.     Patented March 13, 1906.

Application filed August 29, 1904. Serial No. 222,536.

*To all whom it may concern:*

Be it known that I, FULLER TRUMP, a citizen of the United States, residing at Springfield, in the county of Clark and State of Ohio, have invented certain new and useful Improvements in Relief-Valves for Pipes, of which the following is a specification.

My invention relates to improvements in relief-valves for high-pressure pipes where there is a fluctuation of the liquid or fluid in said pipes.

The object of my invention is to provide an improved relief-valve designed to be forced open under a certain strain to prevent the bursting of the main to which it is attached, and also to provide means for cushioning the said valve, and also for automatically closing the valve by the pressure of the liquid or fluid within the main.

My invention consists in the constructions and combination of parts hereinafter described, and set forth in the claims.

In the accompanying drawings, Figure 1 is a side elevation of my improved device shown attached to a main. Fig. 2 is a vertical sectional view of the same. Fig. 3 is a detail of the air-operated valve and devices for operating same.

Like parts are represented by similar letters of reference in the several views.

In the said drawings, $a$ represents a water, gas, or other main in which the liquid or fluid is maintained at a high pressure. Connected to said main at any suitable point is a valve-seat $a'$, having seated thereon a valve $b$. This valve $b$ is preferably in the nature of a puppet-valve, with guiding-wings $b^2$ $b^2$ extending into the seat $a'$, and said valve is secured to said seat by a series of bolts $b^3$, which bolts are tested in advance to break under a certain predetermined strain, the diameters of the respective bolts near their centers being reduced for this purpose, as shown. Above said valve $b$ there is supported on an extension from the valve-seat through the medium of supporting-standards $c'$ a chamber $c$. Within this chamber there is a piston $c^2$, connected by a rod or stem $c^3$ with the valve $b$. Extending from a suitable point in the main $a$ to the upper part of the chamber $c$ is a pipe connection $c^5$ of comparatively small dimensions, and within this pipe connection there is placed a valve $c^6$, preferably a gate-valve of the ordinary type. Secured to said valve is a small cylinder $c^7$, having therein a piston $c^8$ adapted, through the medium of the rod $c^9$ and lever $c^{10}$, to operate said gate-valve. Leading from the upper part of the chamber $c$ to the cylinder $c^7$ is a small pipe $c^{11}$. In the lower part of the chamber $c$ just above the piston $c^2$ when in its normal position is a small outlet $c^{12}$.

The operation of the device is as follows: If the pressure within the main $a$ increases for any reason to a degree sufficient to endanger the main, the bolts $b^3$ will break, the pressure in the main thereupon forcing the valve from its seat and likewise forcing the piston $c^2$ into the chamber $c$. As the piston moves into the chamber the air therein will be compressed, thus forming an air-cushion for the valve $b$, giving an easy gradual movement to the same. As the air is compressed in the chamber $c$ it will be forced through the small pipe $c^{11}$ to the cylinder $c^7$ and acting upon the piston in said cylinder will open the valve $c^6$, thus allowing the liquid or fluid from the main $a$ to enter the upper part of the chamber $c$. As the chamber $c$ fills the piston $c^2$ will be forced outwardly until the valve $b$ is securely seated on its seat $a'$ and is held there until it can be secured by means of new tested bolts in the same manner as before.

Located in the pipe $c^5$ is a check-valve $c^{13}$, placed in close proximity to the chamber $c$, the purpose of this check-valve being to close the said pipe when the relief-valve is forced open, so as to allow for a greater compression of air in the chamber, as it frequently happens that quite a length of pipe is required between the chamber $c$ and the valve $c^6$.

It should be stated that in practice the diameter of the piston $c^2$ should be somewhat greater than that of the valve $b$ in order to afford an increased area to permit the pressure on the piston to overcome the pressure on the valve.

After the valve $b$ has been bolted to its seat the valve $c^6$ will be closed by hand to cut off the supply in the pipe $c^5$, and the water or other liquid in the chamber $c$ will be permitted to escape through the outlet $c^8$. A drain-trough $c^4$ is also provided to catch any liquid which may leak through the piston to prevent it falling on the workmen while securing the valve $b$ in place.

Having thus described my invention, I claim—

1. The combination of a main, a relief-valve therein, a chamber in proximity to said relief-valve, a piston in said chamber connected to said relief-valve, a pipe connection from said main to said chamber, a valve in said pipe connection, and means controlled by said piston for operating said pipe-valve when said relief-valve is opened, substantially as specified.

2. The combination of a main, a relief-valve therein, a chamber in proximity to said relief-valve, a piston in said chamber connected to said relief-valve, a pipe leading from said main to said chamber, an air-operated valve in said pipe, and an air-pipe leading from said chamber to said pipe-valve, substantially as specified.

3. The combination of a main, a relief-valve therein, an air-chamber in proximity to said relief-valve, means connected with said valve for compressing the air within said chamber, and means for establishing a connection between said chamber and main controlled by the air compressed within said chamber, for the purpose specified.

4. A main, a relief-valve therein, an air-chamber in proximity thereto, a piston in said air-chamber connected to said valve, a normally closed connection from said main to said chamber, said piston being adapted when said relief-valve is opened to compress the air in said chamber to form an air-cushion and to open the connection between said main and chamber, substantially as and for the purpose specified.

5. A main, a relief-valve therein, operating devices connected to said valve, a normally closed connection from said main to said operating devices, and means operated by the opening of said relief-valve to open said connection to cause said operating devices to close said valve by the pressure in said main, substantially as specified.

6. A main, a relief-valve therein, a chamber in proximity to said relief-valve, a piston in said chamber connected to said relief-valve, a pipe connection from said main to said chamber, an air-operated valve in said pipe connection, a pipe connection from said chamber to said air-operated valve, and a check-valve in said first-mentioned pipe connection in proximity to said chamber, substantially as specified.

7. The combination of a main with a relief-valve therein, a piston connected with said valve, a chamber for said piston connections between said chamber and said main, means for holding said valve securely to the seat, but adapted to permit same to be opened under a certain predetermined pressure; means for opening automatically the connections extending from said chamber to said main for returning said valve to its seat, and means for preventing a discharge of the water flowing from said main through said chamber until said valve is returned to normal position, substantially as specified.

8. A main, a relief-valve therein, an air-cushion for said valve, and means operated by said air-cushion, when said valve is opened, for permitting the pressure in said main to return said valve to its seat, substantially as specified.

9. A main, a relief-valve therein, a piston connected with said relief-valve, and a chamber for said piston connections between said piston-chamber and said main, adapted to be automatically opened by said piston, means for preventing a discharge of the water from said chamber until said valve is returned to normal position, substantially as specified.

10. A main, a relief-valve therein adapted to open under a certain pressure in said main, a normally closed connection leading from said main to the outside of the actuating device, and means, when said valve is opened, for opening said connection to permit the pressure in said main to return said valve to its seat, substantially as specified.

In testimony whereof I have hereunto set my hand this 25th day of August, A. D. 1904.

FULLER TRUMP.

Witnesses:
   CHAS. I. WELCH,
   CLIFTON P. GRANT.